United States Patent [19]

Jahn et al.

[11] Patent Number: 5,201,919
[45] Date of Patent: Apr. 13, 1993

[54] INTEGRAL IN-LINE GAS SCRUBBER

[75] Inventors: Glenn Jahn, Arvada; Frank Conner; Dennis Graber, both of Aurora, all of Colo.

[73] Assignee: Inline Scrubber Corporation, Commerce City, Colo.

[21] Appl. No.: 808,682

[22] Filed: Dec. 17, 1991

[51] Int. Cl.⁵ .................... B01D 47/02; B01D 47/06
[52] U.S. Cl. ........................... 55/223; 55/227; 55/237; 55/239; 55/245; 55/255; 55/257.2; 55/260
[58] Field of Search .............. 55/223, 227, 233, 235, 55/237, 239, 244, 245, 247, 248, 250, 255, 256, 257.2, 257.3, 257.4, 260

[56] References Cited

U.S. PATENT DOCUMENTS

| | | | |
|---|---|---|---|
| 1,606,032 | 11/1926 | Kolstrand | 55/223 X |
| 1,691,971 | 11/1928 | Hansard et al. | 55/223 |
| 1,751,324 | 3/1930 | Green | 55/237 |
| 1,751,915 | 3/1930 | Hall et al. | 55/237 |
| 1,877,296 | 9/1932 | Goldberg | 55/227 X |
| 2,103,521 | 12/1937 | Luly | 55/227 X |
| 2,227,465 | 1/1941 | Roche, Jr. et al. | 55/223 X |
| 2,387,345 | 10/1945 | Pearl | 55/260 X |
| 2,509,173 | 5/1950 | Schreier et al. | 55/237 |
| 3,460,819 | 8/1969 | Pike | 55/227 X |
| 3,518,817 | 7/1970 | Dell'Agnese et al. | 55/260 X |
| 3,605,386 | 9/1971 | Erwin et al. | 55/227 X |
| 3,624,696 | 11/1971 | Cohen et al. | 55/223 |
| 3,628,311 | 12/1971 | Costarella et al. | 55/223 |
| 3,673,769 | 7/1972 | Gleason | 55/223 |
| 3,713,277 | 1/1973 | Sackett, Sr. | 55/223 |
| 3,721,068 | 3/1973 | Vincent | 55/223 |
| 3,815,332 | 6/1974 | Bobrowsky et al. | 55/223 |
| 3,895,926 | 7/1975 | Lerner | 55/260 X |
| 3,907,525 | 9/1975 | King | 55/260 X |
| 3,989,485 | 11/1976 | Kilian | 55/260 X |
| 4,028,077 | 6/1977 | Gleason | 55/257.3 X |
| 4,157,250 | 6/1979 | Regehr et al. | 55/257.2 X |
| 4,231,765 | 11/1980 | Scott | 55/260 X |
| 4,372,761 | 2/1983 | Lindroos | 55/260 |
| 4,375,976 | 3/1983 | Potter | 55/223 X |
| 4,533,522 | 8/1985 | Leimkühler | 422/170 |

FOREIGN PATENT DOCUMENTS

| | | | |
|---|---|---|---|
| 364383 | 8/1906 | France | 55/227 |
| 575293 | 4/1958 | Italy | 55/227 |

Primary Examiner—Robert Spitzer
Attorney, Agent, or Firm—James R. Young

[57] ABSTRACT

A gas scrubbing device having inlet and outlet ports that allows a gas stream to enter the scrubber from the bottom and exit through the top. The gas direction is reversed several times, fed through a venturi to accelerate the gas flow, and passed over two sumps containing scrubbing liquid. The combination of the high speed gas flow, gas flow reversal, and scrubbing liquid removes most particulates from the gas. The gas flows upward through a mist of scrubbing liquid created by a spray nozzle, and as the gas flows beyond the mist it flows through a series of deflection vanes which spin the gas to remove liquid droplets. The gas then passes through a series of serpentine vanes which cause the gas to change direction flow removing additional liquid droplets from the gas, through a reducing element, and out through the outlet port.

9 Claims, 5 Drawing Sheets

INTEGRAL IN-LINE GAS SCRUBBER

FIELD OF THE INVENTION

This invention relates to devices for removing particulates from a gas and more particularly to such devices using a liquid to assist in such removal. Even more particularly, the invention relates to an in-line gas scrubber that combines liquid scrubbing with a venturi gas accelerator, double sumps, double mist eliminators, and multiple reversals of the gas flow.

BACKGROUND OF THE INVENTION

Treatment of chemical and particulate laden exhaust fume gasses is a major concern in the protection of the environment. Various forms of air and gas cleaners or scrubbers are known in the prior art including scrubbers for removing particulate solids from a contaminated air stream. Most of these prior art devices, while in general accomplishing their objectives, are unduly complex and bulky and tend to be inefficient and costly.

Treatment of an air stream by impinging the air stream on a scrubbing liquid is well known in the art as illustrated by U.S. Pat. No. 3,624,696 entitled "Gas Scrubbing Apparatus" issued Nov. 30, 1971 to Cohen et al. Cohen et al. discloses a gas scrubber where gas enters in a downward direction on one side of the scrubber and impinges on a scrubbing liquid. The gas then reverses direction and flows upward through a pair of baffles which reverse the direction of the gas. The gas then flows through a mist eliminator before passing through a blower and being exhausted. One limitation of the device of Cohen et al. is that the gas enters the side of the scrubber moving in a downward direction. If a scrubber is to be used for cleaning air from a vent hood, such as might be placed over a work area, the gasses are typically exhausted upward out of the hood and must first be reversed before entering the scrubbing device of Cohen et al. During this first reversal, many particulates are removed from the gas and either fall back into the vent hood or are left in the duct system.

U.S. Pat. No. 3,673,769 entitled "Gas Scrubber", issued Jul. 4, 1972 to Gleason describes a device similar to the Cohen et al. device wherein gas enters the side of the scrubber and is immediately turned at a right angle to impinge downward onto a scrubbing liquid in a sump. After passing through the scrubbing liquid, the gas exhausts the sump area through a set of vanes and out through the top of the air scrubber.

U.S. Pat. No. 3,713,277 entitled "Fog Impingement Scrubbing System", issued Jan. 30, 1973 to Sackett shows a system which also has side entry of the air stream followed by diverting the air stream downward as it passes over scrubbing liquid sprayers. The gas then reverses direction at the bottom of the scrubber and flows up through a filtering system and out the top of the scrubber.

U.S. Pat. No. 3,721,068 entitled "Gas Stream Scrubber", issued Mar. 20, 1973 to Vincent describes an air scrubbing device with a side entry port, and a series of baffles causing the gas flow to reverse direction. The baffles may be moved to create a longer or shorter gas flow path, depending upon the gas pressure within the scrubber.

U.S. Pat. No. 3,815,332 entitled "Gas Scrubber and Method", issued Jun. 11, 1974 to Bobrowsky et al. shows a system having the gas stream entering the top of the scrubber and flowing through the scrubbing liquid before exiting back out the top of the scrubber.

U.S. Pat. No. 4,533,522 entitled "Apparatus for the Desulferization of Flue Gasses", issued Aug. 6, 1985 to Leimkühler shows a system having a plurality of nozzles for dispersing the scrubbing liquid. In this system the gasses enter from the top of the scrubber, reverse direction as they pass near the sump area of the scrubber and exit back out the top of the scrubber.

All the above described art uses at most a single mist eliminator to remove scrubbing liquid droplets from the air stream. Often this leaves the air stream still saturated with water, which can build up in the air ducts following the scrubber. Also, all the above described art provides only a single impingement of the gas on sump containing the scrubbing or cleansing liquid.

There is need in the art then for a gas scrubbing device which allows entry of the gas stream from the bottom of the scrubber and exits through the top of the scrubber to allow the scrubber to conveniently be placed on top of a vent hood. There is further need in the art for such a scrubber containing multiple mist eliminators to more completely dry the gas before it exits the scrubber. A still further need in the art is to direct the contaminated gas toward multiple sumps containing scrubbing liquid to remove the highest amount of particulate matter. The present invention meets these and other needs in the art.

SUMMARY OF THE INVENTION

It is an aspect of the present invention to provide a device which removes particulates and fumes from a gas.

It is another aspect of the invention to provide such a device having in-line inlet and outlet ports that allows the device to be mounted in a vertical gas exhaust duct line.

Yet another aspect of the invention is to provide a gas scrubbing device which lowers maintenance requirements by having no moving parts.

Still another aspect of the invention is to provide a gas scrubber which lowers consumption of scrubbing liquid, therefore lessening the need for waste liquid treatment, by using a single spray nozzle.

A further aspect of the invention is to provide a gas scrubber with a continuously self-flushing sump system to reduce sludge build up.

A still further aspect is to provide a gas scrubber having two mist eliminators, each being of a different type, to more completely dry the gas before it exits the scrubber.

Yet another aspect is to provide a gas scrubber having a venturi gas flow accelerator, in combination with baffles to reverse gas flow, which improves the removal of particulates from the gas.

The above and other aspects of the invention are accomplished in a system in which the inlet port allows the gas stream to enter the scrubber from the bottom to allow the scrubber to be mounted vertically above a vent hood. The gas direction is then reversed and fed through a venturi to accelerate the gas flow. After being accelerated, the gas direction is again reversed as the gas passes a sump containing scrubbing liquid. The combination of the high speed gas flow, gas flow reversal, and scrubbing liquid causes removal of many particulates within the gas.

The gas then flows upward and then reverses direction a third time to flow downward toward a second sump containing additional scrubbing liquid. As the gas exits the venturi system in a downward flow it impinges on the scrubbing liquid in the second sump to remove additional particulate matter and fumes. The gas then reverses direction a forth time to flow upward through a mist of scrubbing liquid created by a spray nozzle. As the gas flows beyond the mist it encounters a series of vanes which cause the gas to spin allowing centrifugal force to remove liquid droplets from the gas. After passing the deflection vane system, the gas passes through a series of serpentine vanes which causes the gas to change direction flow removing additional liquid droplets from the gas. The gas then flows through a reducing element and out vertically through the outlet port of the scrubber.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
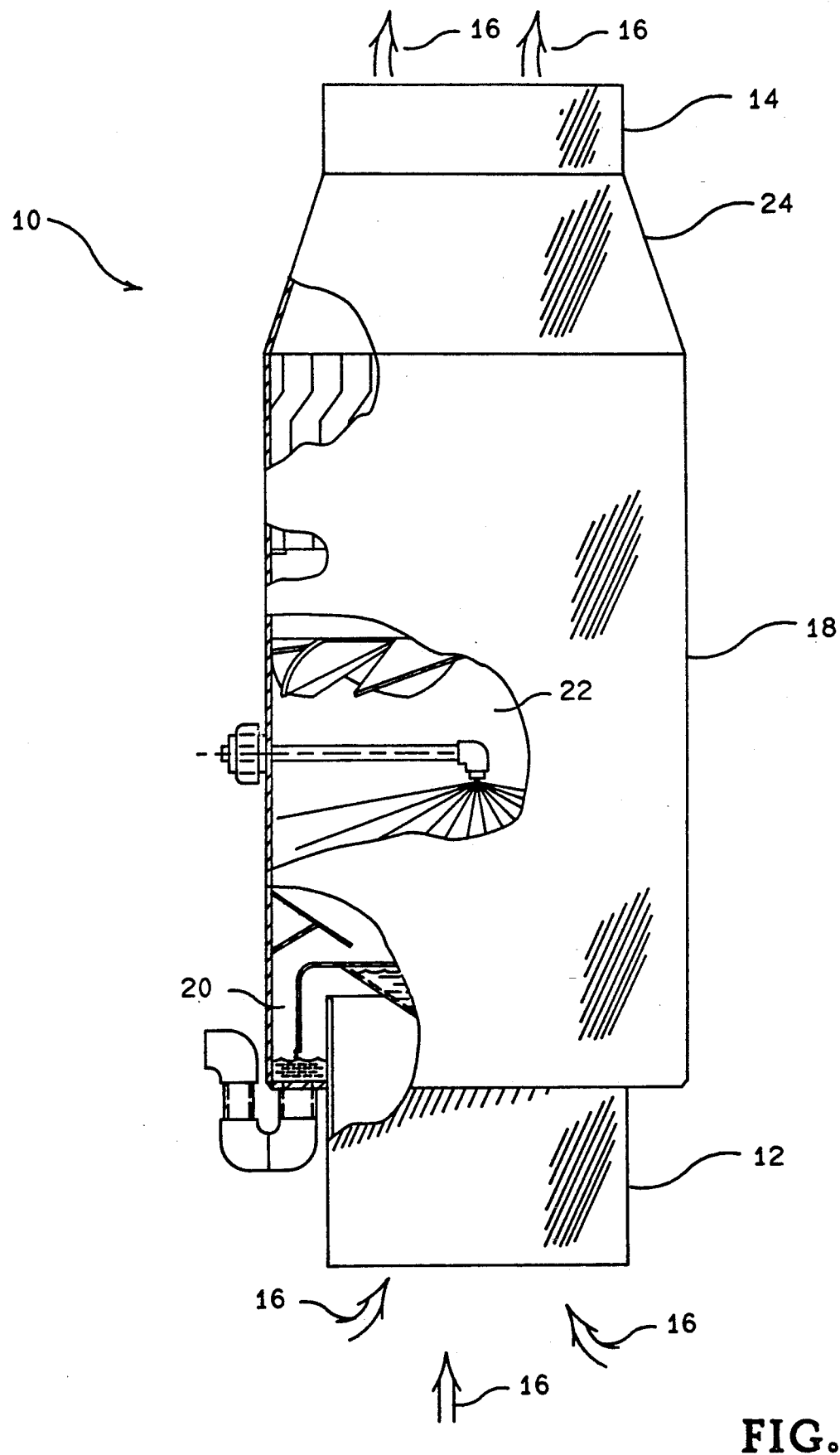
FIG. 1 shows a side elevation view of the in-line gas scrubber and illustrates the gas flow with arrows.

FIG. 1 shows a side elevation view of the in-line gas scrubber of the present invention. Referring now to FIG. 1, the gas scrubber of the present invention, generally designated 10, contains an inlet port 12 and an outlet port 14. Gas flow through the scrubber is indicated generally by large arrows 16. The main body 18 of the scrubber 10 is generally cylindrical in shape and is slightly larger than the inlet port 12 and the outlet port 14. As contaminated air enters the inlet port 12, it passes a pair of baffles that create a small passage way 20 which acts as a venturi and causes the gas to significantly accelerate. The gas may accelerate to a flow six times as fast as the original flow. After going through the venturi passage 20 the gas enters the central area 22 of the gas scrubber 10 and after passing through a pair of mist eliminators the gas passes a conical reducer 24 before exiting through the outlet port 14.

Figure 2:
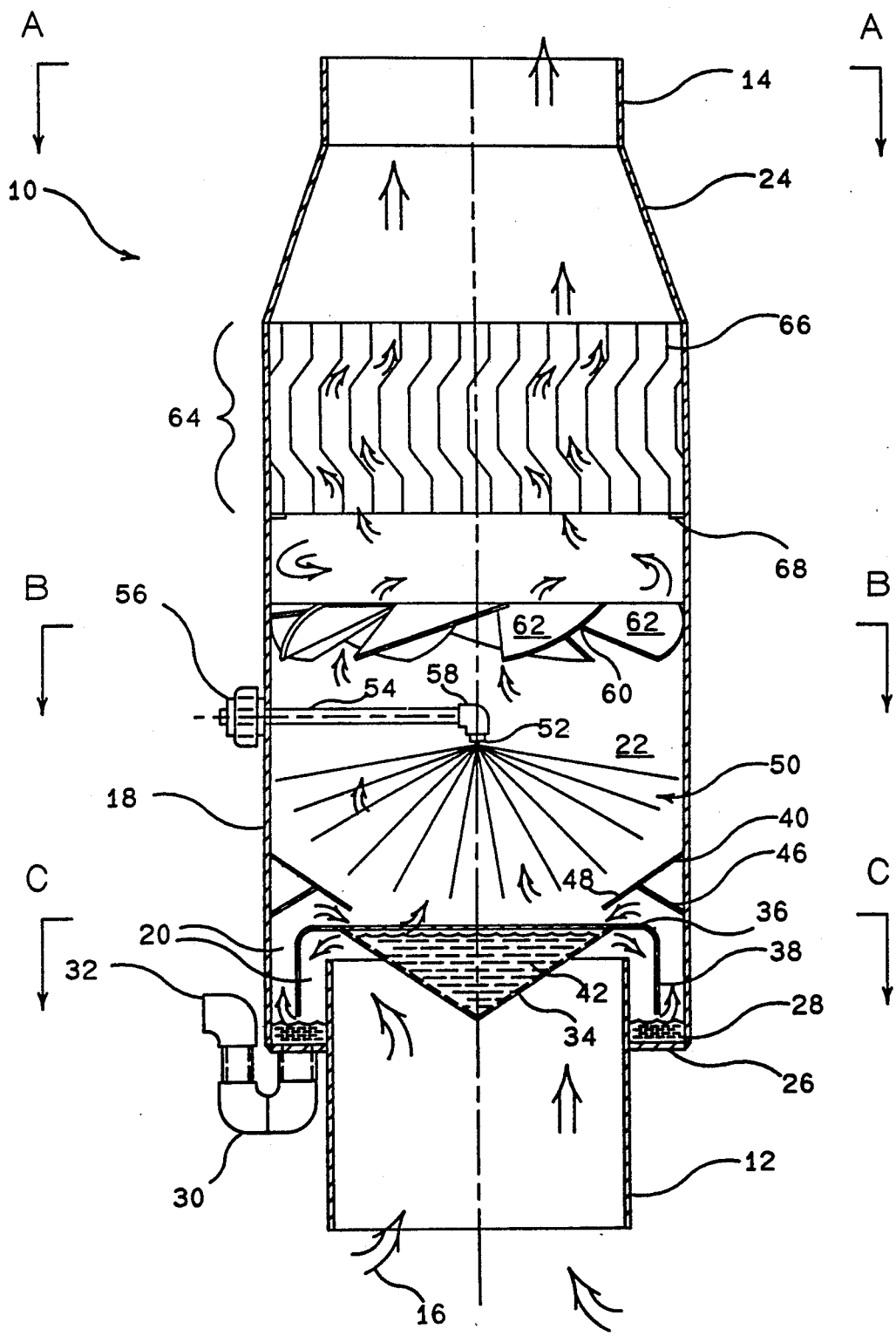
FIG. 2 shows a cross section view of the scrubber.

FIG. 2 shows a cross section view of the scrubber, taken vertically through the center of the device. Referring now to FIG. 2, the scrubber 10 is shown with the inlet port 12, the outlet port 14, and the conical reducer 24. Arrows 16 generally designate the flow of gas through the scrubber 10.

Inlet port 12 is a cylindrical duct which will both support the unit and provide an entrance for the contaminated gas stream. Inlet port 12 is designed to mate with the outlet port of a vent hood, or with any circular air duct. Inlet port 12 extends through the circular bottom 26 of the gas scrubber 10, and is sealed to prevent liquid within the sump area 28 from draining through the bottom 26. The sump area 28 is formed by the extended walls of the inlet port 12, the bottom 26, and the outer wall 18 of the scrubber 10. The sump 28 is drained through a p-trap drain 30. The sump 28 occupies the entire perimeter of the scrubber 10, and the scrubbing liquid level within the sump 28 is regulated by the height of the exit 32 of the p-trap drain 30. The drain 30 which is removable for maintenance and cleaning, comprises a u-bend pressure locked trap and outlet fitting 32.

As air enters the inlet port 12 it encounters an inverted diverging cone 34 which is mounted in the center of the inlet port 12. The cone 34 directs incoming gasses symmetrically toward a baffle 36. The baffle 36 and the cone 34 may be attached to the inlet port 12 or the side walls 18. In either case, the attachment means would leave holes for the gas to pass through. As the gas moves upward, it passes through a venturi area 20 formed by the baffle 36 and an upper edge of the inlet port 12. When the gas first passes into the venturi area 20 it reverses direction and accelerates downward toward the sump 28. A cylindrical baffle 38 contains the gas and directs it toward the sump 28. As the gas reaches the end of the cylindrical baffle 38 the gas again reverses directions and moves upward toward a third baffle 40. The baffle 40 directs the ga toward the center of the scrubber 10 and toward a second sump 42. The baffle 40 is comprised of two conical sections, 46 and 48, connected together and attached to the inside of the wall 18. The conical section 46 directs the air flow toward the center of the gas scrubber 10 and conical section 48 turns the air flow downward toward the second sump 42. A top side of the conical section 48 forms a sloping funnel that directs scrubbing liquid into the second sump 42.

As gas passes the end of the conical section 48, the gas reverses directions and emits additional particulate matter into the second sump 42. The air then moves upward into the main chamber 22. Scrubbing liquid, shown as a spray 50, is introduced into the main chamber 22 by means of a spray nozzle 52, located in the center of the scrubber 10 directly above the second sump 42. A fitting 56 connects an external scrubbing liquid supply to a connector pipe 54, an elbow 58, and then to the spray nozzle 52. Typically the scrubbing liquid will be water, however, other liquid chemicals may be used for scrubbing some contaminates from a gas.

As the gas moves into the main chamber 22, the scrubbing spray 50 removes additional fumes and particulate matter from the gas stream and deposits the material removed into the second sump 42. As the second sump 42 fills up, it overflows over baffle 36 and along the side of baffle 38 into the sump 28 and then out through the drain 30.

After the gas flow passes through the spray mist 50, it encounters a radial deflection vane section 60, which is comprised of a plurality of pie-shaped flat plates arranged in a radial configuration and joined at the center. Plates 62 of the deflection vane section 60 are tilted uniformly to create angular slots between the plates 62, and fixed to the side wall 18 of the scrubber 10. The center of the section 60 is located directly above the spray nozzle 52. The deflection vane section 60 provides an impacting plate for the gasses and liquid droplets that have been absorbed into the gas system from the spray 50. The deflection vane section 60 also deflects the gas stream into a swirling motion allowing centrifugal force to expel some of the water droplets onto the side walls 18 of the scrubber 10 where the droplets run back down into the second sump 42.

Although in the preferred embodiment the plates 62 of the deflection vane section 60 are fixed, in other embodiments, the plates could be movable, such as through rotation.

After passing the vane section 60, the gas stream enters a serpentine mist eliminator section 64, which is located directly above the deflection vane section 60. The mist eliminator 64 is comprised of a plurality of identical serpentine profile plates, 66, fixed together to provide a gap between each of the plates 66. A flat plate ring 68 is mounted below and in contact with the mist eliminator section 64 to prevent any bypass of the gasses along the side wall 18. As the moisture laden gasses traverse through chambers between the serpentine plates 66, the gas flow changes direction several times, depositing most of the fine liquid droplets on the side walls of the plates 66. This liquid eventually drips back down to the second sump 42. The ring 68 ensures that all gas flow is directed through the plates 66 within the mist eliminator 64 and serves as a bracket to secure the mist eliminator 64 in a firm and fixed position. The cleansed and dried gas stream then passes through a conical shaped reducer 24 which directs the gas into the outlet port 14 where it exits from the scrubber 10.

Figure 3:
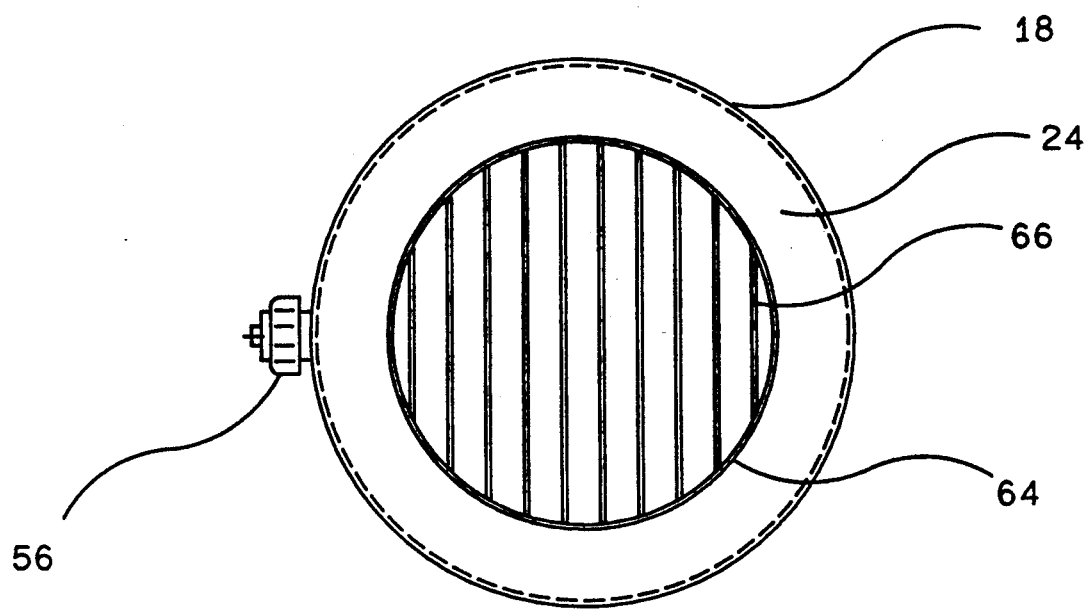
FIG. 3 shows a cross sectional view of the serpentine mist eliminator of the invention.

FIG. 3 shows a cross-sectional view of the serpentine mist eliminator 64, taken through the line A—A of FIG. 2. Referring now to FIG. 3, the outer wall 18 is shown containing the conical reducer 24 and the mist eliminator 64. Within the mist eliminator 64, a plurality of vanes 66 are shown.

Figure 4:
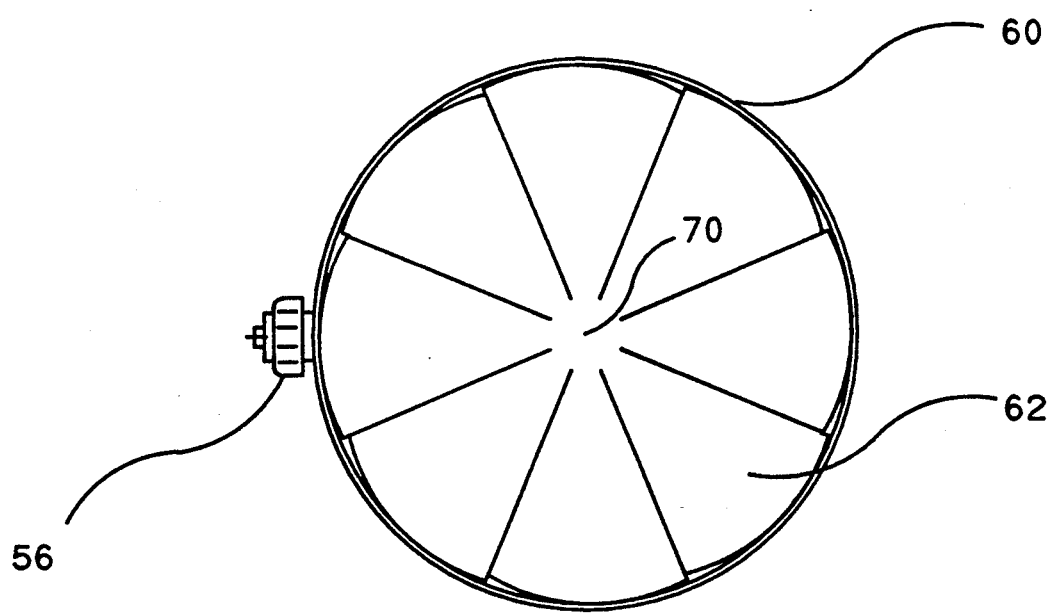
FIG. 4 shows a cross sectional view of the deflection vane mist eliminator of the invention.

FIG. 4 shows a cross-sectional view of the deflection vane mist eliminator 60 taken on the line B—B of FIG. 2. Referring now to FIG. 4, the deflection vane mist eliminator 60 is shown containing the plurality of vanes 62. Each of the vanes 62 is pie-shaped and arranged to join at the center 70.

Figure 5:
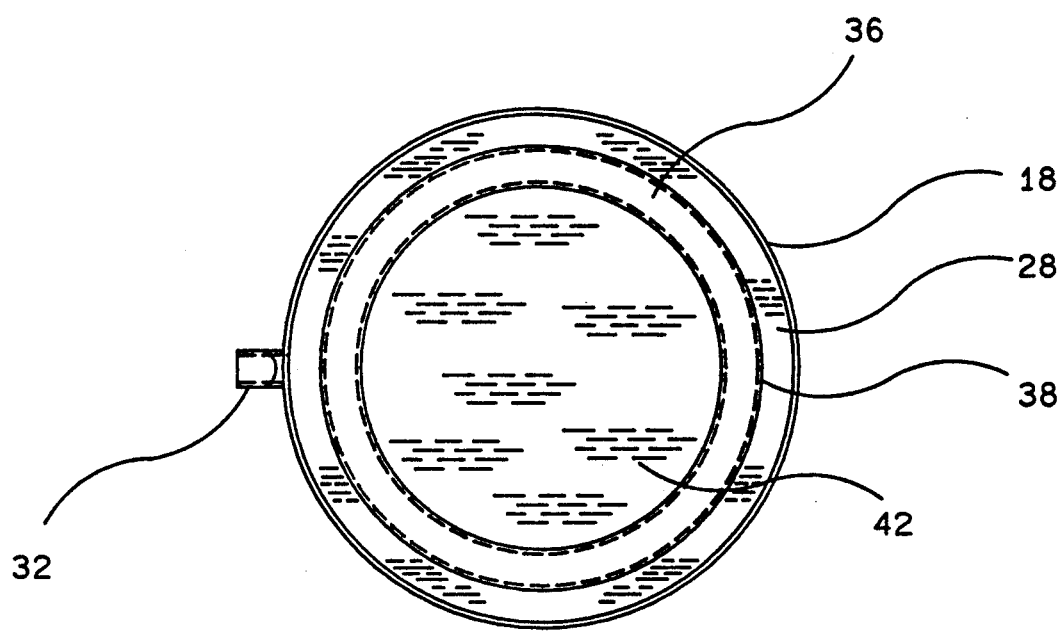
FIG. 5 shows a cross sectional view of the sump area of the invention.

FIG. 5 shows a cross-sectional view of the sump areas 42 and 28 taken through the line C—C of FIG. 2. Referring now to FIG. 5, the outer wall 18 of the scrubber 10 is shown with the sump area 28 just inside the outer wall. The cylindrical baffle 38 is shown on end, along with the top of the baffle 36. Inside the baffle 36 is the second sump area 42.

Figure 6:
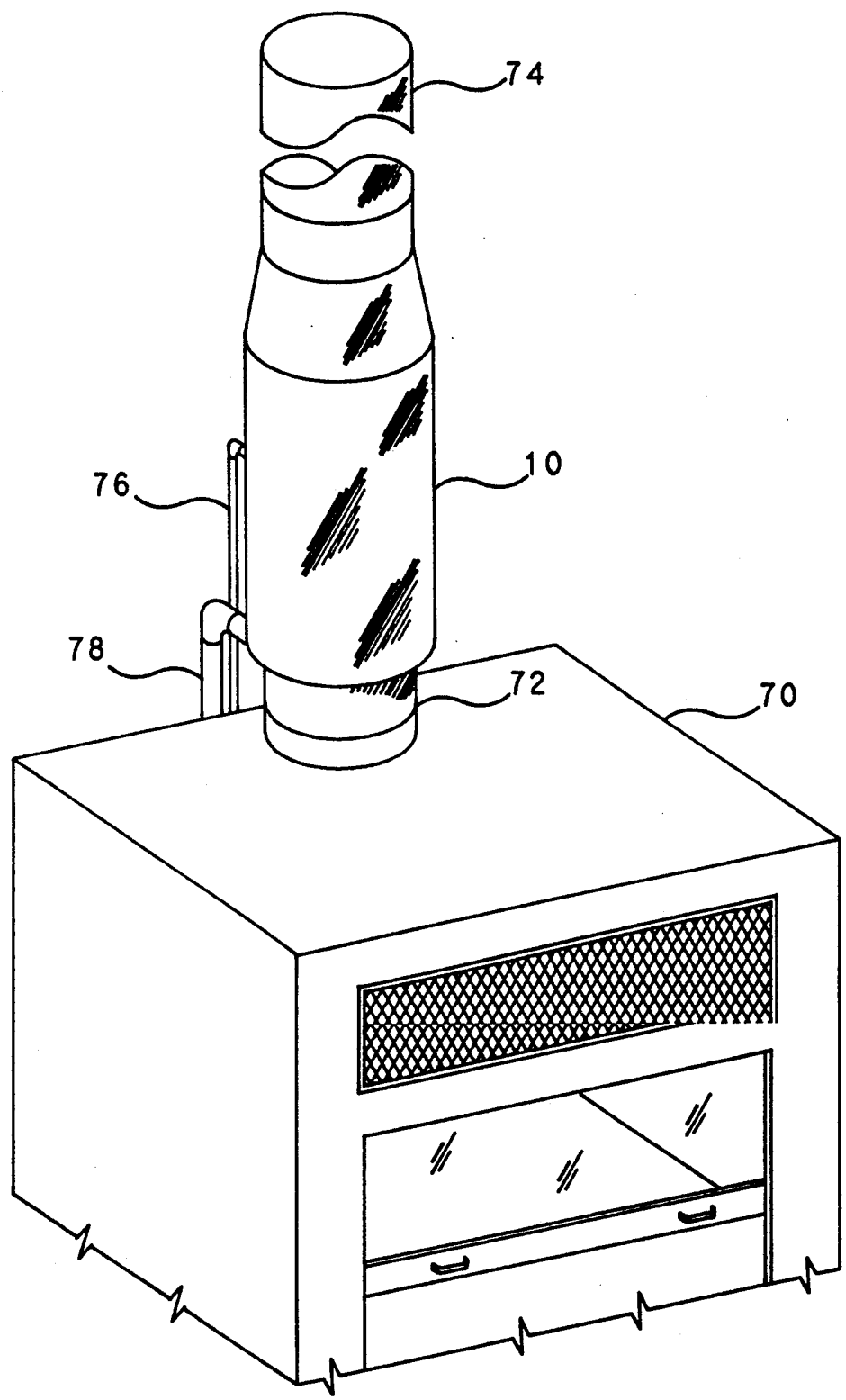
FIG. 6 shows one environment in which the invention may be used.

FIG. 6 shows one environment in which the fume scrubber of the present invention may be used. Referring now to FIG. 6, a vent hood, such as might be used to cleaning using a solvent, is shown having an exit air duct 72. mounted in the air duct 72 is the fume scrubber 10 of the present invention. An air duct 74 is attached to the exit port of the scrubber 10 to carry the scrubbed gases away from the vent hood 70. A pipe 76 is used to bring scrubbing liquid, such as water, to the scrubber 10, and a drain pipe 78 is attached to the scrubber 10 to carry away scrubbing liquid from the sump 28 (not shown).

Referring back to FIG. 2, in operation, as a contaminated gas stream enters the scrubber via the inlet port 12, generally indicated by arrow 16, the gas impinges upon the cone profile 34 which forms the base of the second reservoir 42. The cone 34 concentrically diverts the contaminated gas stream outward towards baffle 36 where the gas stream reverses direction downward while accelerating toward the sump 28. This reversal in direction may remove some particulates from the gas stream and as these particulates are removed they collide with a cylindrical baffle 38 and fall into the sump 28. The acceleration of the gas occurs because of a venturi effect due to the decrease in area of the air passage within the venturi area 20.

As the contaminated gasses collide with the scrubbing liquid within sump 28, particulate matter within the gasses remains in the scrubbing liquid 28. Removal of the particulates at this point is enhanced by the reversal of the gas in an upward direction toward baffle 40. Also, the largest particulates are removed at this location, and they are quickly drained through drain 30.

The intense turbulence of the gas stream impaction onto the scrubbing liquid within the sump 28 causes liquid droplets to form from the scrubbing liquid within the sump 28 and these droplets, along with the gas stream, are drawn upward toward the baffle 40. When the gas and droplets impact conical section 46 of the baffle 40 they are directed 90 degrees sideways where they impact conical section 48 of the baffle 40 which changes their direction downward toward the second sump 42. As the gasses pass between conical section 48 and the baffle 36, they are again accelerated by the venturi effect and the gas, now at its maximum velocity, impacts the scrubbing liquid within the upper reservoir 42, removing additional particulate matter and contaminates. Because the gas is at high velocity during this impact, the liquid within the second sump 42 is agitated, improving the contact of the particulate matter and contaminants in the gas with the scrubbing liquid to remove a high percentage of particulate matter and contaminants.

The gas stream reverses direction as it impacts the liquid within the second sump 42 and moves upward through the atomized spray mist 50 emanating from the nozzle 52. The fine mist droplets within the spray 50 aid in scrubbing any remaining contaminants. Because of the two sumps and the early removal of most particulates, the spray needed is only a fine mist from a low volume spray nozzle, thus reducing the amount of scrubbing liquid needed.

As the gas passes through the spray 50, it absorbs additional droplets from the scrubbing liquid and these droplets, along with the gas stream, impact the surface of the deflection vane blade section 60. Because of the angle of the blades 62, the gas stream is diverted into an outward swirling motion which, by means of centrifugal force, removes many of the liquid droplets from the gas stream and deposits these liquid droplets onto the inner surface of the wall 18. As the gas stream continues upward it encounters the serpentine mist eliminator 64 which causes several direction changes to remove the remaining liquid droplets suspended in the gas stream. The scrubbed and dried gasses then converge through the reducer cone 24 and exit through the outlet port 14.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A gas scrubbing device for removing contaminates contained in a gas stream, said scrubbing device comprising:

a vertical inlet port for receiving said gas stream in a first vertical direction;

main chamber means having side walls;

a first sump containing scrubbing liquid, said sump being formed between outside walls of said inlet port and said side walls of said main chamber;

first baffle means mounted inside said side walls of said main chamber and being horizontally displaced above said inlet port, said first baffle means being oriented to reverse a direction of flow of said gas stream to direct said gas stream in a second vertical direction, opposite said first vertical direction, toward said sump;

second baffle means connected to said first baffle means and extending toward said sump between said outside walls of said inlet port and said side walls of said main chamber, said second baffle being oriented to form two air passageways between said outside walls of said inlet port and said side walls wherein said direction of flow of said gas stream is reversed a second time within said two passageways, whereby said gas stream again flows in said first vertical direction after passing said second baffle;

a second sump containing scrubbing liquid, said second sump being mounted within said main chamber;

third baffle means connected to said main chamber side walls above said second baffle means, said third baffle means being oriented to reverse said flow of said gas stream and directing said gas stream toward said second sump;

spray nozzle means attached to a side wall of said main chamber for introducing a scrubbing liquid mist into said gas stream;

vertically displaced serpentine vane means connected to a top of said main chamber for removing liquid droplets from said stream of gas; and outlet port means connected to a top of said serpentine vane means for directing said gas in said first vertical direction out of said device.

2. The gas scrubbing device of claim 1 further comprising horizontally displaced deflection vane means connected to a side wall of said main chamber above said spray nozzle means for directing said gas stream in a circular motion to remove liquid droplets from said gas stream.

3. The gas scrubbing device of claim 2 wherein said horizontally displaced deflection vane means comprises movable plate means.

4. The gas scrubbing device of claim 2 wherein said first baffle means comprises an inverted cone mounted at a center of said vertical inlet port, and further wherein said inverted cone forms walls of said second sump.

5. The gas scrubbing device of claim 1 wherein said first baffle means comprises an inverted cone mounted at a center of said vertical inlet port.

6. The gas scrubbing device of claim 1 further comprising drain means connected to said sump.

7. The gas scrubbing device of claim 6 further comprising overflow means connected to said drain means, wherein said overflow means regulates an amount of scrubbing liquid contained in said sump.

8. The gas scrubbing device of claim 1 further comprising reducing means mounted between said serpentine vane means and said outlet port.

9. The gas scrubbing device of claim 1 wherein said outside walls of said inlet port, said second baffle means, and said side walls are mounted to restrict a cross-sectional size of said two passageways formed therebetween to a cross-sectional size less than a cross-sectional size of said inlet port whereby a venturi effect which accelerates said gas stream is created.

* * * * *